UNITED STATES PATENT OFFICE.

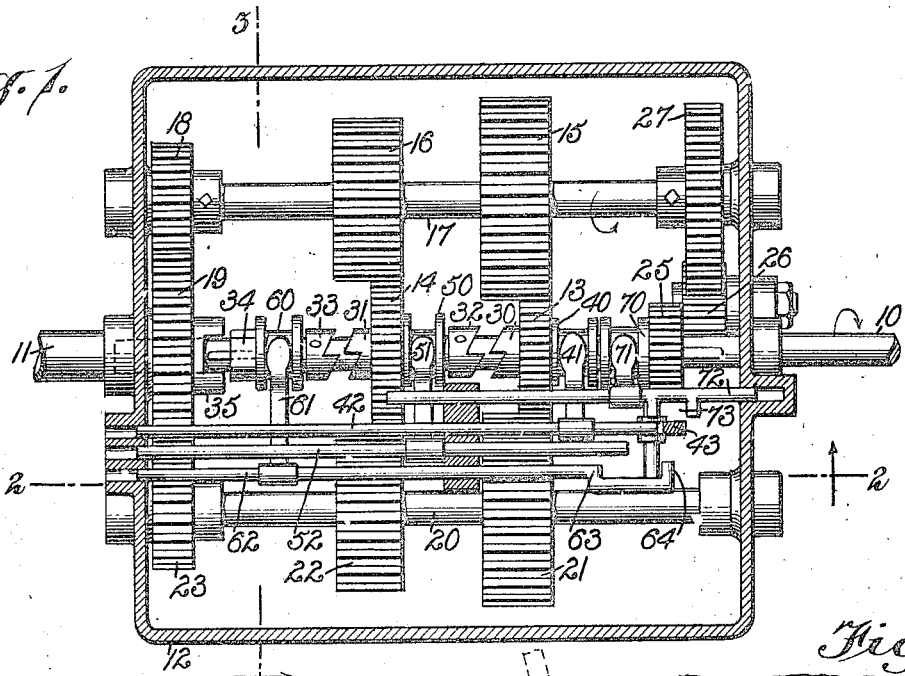
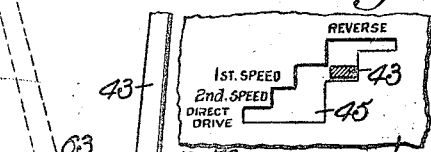
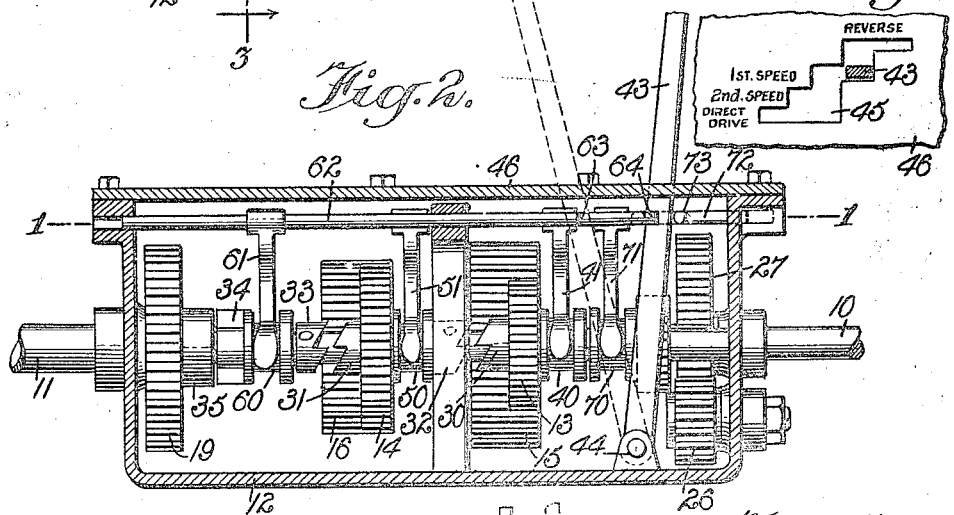
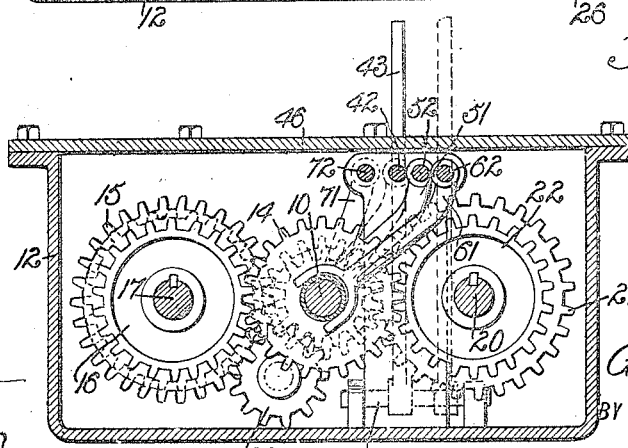

GEORGE Q. SEAMAN, OF BROOKLYN, NEW YORK.

CHANGE-SPEED GEARING.

1,236,113.  Specification of Letters Patent.  Patented Aug. 7, 1917.

Application filed September 27, 1916. Serial No. 122,381.

*To all whom it may concern:*

Be it known that I, GEORGE Q. SEAMAN, a citizen of the United States, and a resident of the city of New York, borough of Brooklyn, in the county of Kings and State of New York, have invented a new and Improved Change-Speed Gearing, of which the following is a full, clear, and exact description.

The invention relates to change speed gearing such as shown and described in the Letters Patent of the United States, No. 1,185,350, granted to me on May 30, 1916.

The object of the invention is to provide a new and improved change speed gearing more especially designed for use on automobiles and other power-driven vehicles and devices and arranged to permit the operator to readily shift from a lower speed to a higher speed and in doing so causing the lower speed to move automatically out of action and without moving out of gear with its companion gear wheel.

In order to accomplish the desired result, use is made of different speeds and means for automatically moving a lower speed out of active position on shifting to a next higher speed.

A practical embodiment of the invention is represented in the accompanying drawings forming a part of this specification, in which similar characters of reference indicate corresponding parts in all the views.

Figure 1 is a sectional plan view of the change speed gearing on the line 1—1 of Fig. 2;

Fig. 2 is a sectional side elevation of the same on the line 2—2 of Fig. 1;

Fig. 3 is a cross section of the same on the line 3—3 of Fig. 1; and

Fig. 4 is a sectional plan view of the shifting lever, in position in its guideway arranged in the top of the casing.

The power or engine shaft 10 is in axial alinement with the shaft 11 to be driven and the said power shaft 10 and the driven shaft 11 extend into a gear casing 12, as plainly illustrated in the drawings. On the power shaft 10 within the gear casing 12 are mounted to rotate loosely shiftable gear wheels 13 and 14 of different diameters and in mesh with gear wheels 15 and 16 likewise of different diameters and secured on a countershaft 17 journaled on the casing 12 and arranged parallel to the shafts 10 and 11. The gear wheels 15 and 16 are considerably wider than the gear wheels 13 and 14 so that the latter remain at all times in mesh with the gear wheels 15 and 16 when shifting the gear wheels 13 and 14, as hereinafter more fully described. On the countershaft 17 is secured a gear wheel 18 less in diameter than the gear wheel 16 and in mesh with a larger gear wheel 19 secured on the driven shaft 11. For counterbalancing purposes use is made of a second countershaft 20 journaled in the casing 12 on the opposite side of the shaft 10 on which the countershaft 17 is located, and this countershaft 20 is provided with gear wheels 21, 22 and 23 corresponding in diameter to the gear wheels 15, 16 and 18 and likewise in mesh with the gear wheels 13, 14 and 19.

A reversing gear wheel 25 is mounted to rotate with and to slide lengthwise on the power shaft 10 and this gear wheel is adapted to be moved into mesh with an intermediate gear wheel 26 in mesh at all times with a gear wheel 27 on the countershaft 17. Normally the reversing gear wheel 25 is out of mesh with the intermediate gear wheel 26, but when it is desired to reverse the gearing then the gear wheel 25 is moved in mesh with the intermediate gear wheel 26, as hereinafter more fully explained.

Cam coupling members 30 and 31 are secured or formed on the gear wheels 13 and 14 and the said cam coupling members are adapted to engage corresponding cam coupling members 32 and 33 fixed on the power shaft 10. A coupling member 34 is mounted to turn with and to slide lengthwise on the power shaft 10 and this coupling member 34 is adapted to engage a coupling member 35 secured to or formed on the gear wheel 19 so that when the coupling member 34 is in mesh with the coupling member 35 then the driven shaft 11 is directly driven from the power shaft 10.

The gear wheel 13 is provided with a shifting collar 40 engaged by a shifting fork 41 attached to a shifting rod 42 arranged parallel with the power shaft 10 and mounted to slide in suitable bearings arranged within the casing 12. The right-hand end of the rod 42 is adapted to be engaged by a shifting lever 43 fulcrumed at 44 within the casing and extending through a guideway 45 formed in the top 46 of the casing 12. The lever 43 is mounted to swing sidewise and also has a slight transverse movement for the purpose hereinafter more fully explained. When the gear wheels 25, 13 and 14 are in neutral positions, as shown in Figs. 1 and 2, and the lever 43 is opposite the right-hand end of the rod 42 and a swinging motion is given to the lever 43 from the right to the left then the rod 42 and the shifting fork 41, the collar 40 and the gear wheel 13 are moved to the left so that the coupling member 30 moves into engagement with the member 32 fixed on the power shaft 10. The continuous rotary motion of the power shaft 10 is now transmitted by the coupling members 32 and 30, gear wheel 13 and gear wheel 15 to the countershaft 17 which by the gear wheels 18 and 19 imparts a rotary motion to the driven shaft 11 at the lowest speed.

The gear wheel 14 is provided with a shifting collar 50 engaged by a shifting fork 51 attached to a shifting rod 52 mounted to slide in suitable bearings arranged on the casing 12, and the said shifting rod 52 is parallel to the shifting rod 42 and is adapted to be engaged at its right-hand end by the lever 43 to permit the operator to push the rod 52 to the left with a view to move the gear wheel 14 in a like direction so that the coupling member 31 engages the coupling member 33. When this takes place the countershaft 17 is rotated from the power shaft 10 at a higher rate of speed and this speed is transmitted by the gear wheels 18 and 19 to the driven shaft 11. When the coupling member 31 moves into engagement with the coupling member 33 then the coupling member 30 is still in engagement with its coupling member 32, but as the countershaft 17 is now driven at a higher rate of speed and the gear wheel 15 now rotates the gear wheel 13 at a higher rate of speed, it is evident that the cam coupling member 30 gradually moves out of engagement with the coupling member 32 owing to the cam surfaces of the coupling members 30 and 32 causing the coupling member 30 to move to the right, that is, out of active position into inactive position. It is understood that the gear wheel 13 moves with its coupling member 30 from the left to the right and with it the shifting collar 40, the fork 41 and the rod 42.

The coupling member 34 previously mentioned is provided with a shifting collar 60 engaged by a shifting fork 61 attached to a shifting rod 62 similar to the shifting rods 52 and 42 and likewise mounted to slide in suitable bearings in the casing 12. The shifting rod 62 is provided with two spaced lugs or shoulders 63, 64 adapted to be engaged by the lever 43. Presuming that the coupling member 31 is still in engagement with the coupling member 33 and the lever 43 is engaged with the shoulder 63 and swung to the left then the rod 62 is shifted to the left and with it the fork 61, the collar 60 and the coupling member 34 to engage the latter with the coupling member 35 so that the driven shaft 11 is directly driven from the power shaft 10 and at a higher rate of speed than the second speed at which the countershaft 17 was driven from the gear wheel 14. The rotary motion of the driven shaft 11 at the higher speed causes the gear wheel 19 to rotate the gear wheel 18 and consequently the countershaft 17 at a higher rate of speed whereby the coupling member 31 is driven at a higher rate of speed and consequently it automatically moves out of engagement with its companion coupling member 33. When the coupling member 31 moves out of engagement with its companion coupling member 33 then the gear wheel 14 moves back to neutral position and with it the collar 50, fork 51 and rod 52. From the foregoing it will be seen that automatic means are provided for automatically moving the lower speed out of action on shifting to the next higher speed.

The reversing gear wheel 25 is provided with a shifting collar 70 engaged by a shifting fork 71 attached to a shifting rod 72 similar to the shifting rods 42, 52 and 62 and likewise mounted to slide in suitable bearings arranged on the casing 12. The shifting rod 72 is provided with a fork 73 adapted to be engaged by the lever 43 to enable the operator to move the rod 72 from the left to the right with a view to engage the reversing gear wheel 25 with the intermediate gear wheel 26 whenever it is desired to reverse the motion of the driven shaft 11. When it is again desired to rotate the shaft 11 in a forward direction the lever 43 is moved to the left and with it the rod 72 to move the gear wheel 25 out of mesh with the intermediate gear wheel 26. It is understood that prior to shifting the reversing gear wheel 25 into active position the shifting rod 62 is returned to neutral position with a view to moving the coupling member 34 out of engagement with the coupling member 35.

By reference to Fig. 4, it will be noticed that the guideway 45 for the lever 43 is arranged to permit of conveniently shifting the lever from neutral position to first speed, second speed, direct drive or reverse position, as desired by the operator. It is understood that when the several parts are in neutral position as illustrated in the drawings, and the power shaft 10 is rotating in the direction indicated and the operator desires to drive the shaft 11 at first speed then the operator simply swings the lever 43 from the right to the left to move the rod 42 in a like direction and with it the gear wheel 13 so that the coupling member 30 moves into engagement with the coupling member 32. The rotary motion of the power shaft 10 is now transmitted by the clutch members 32, 30, gear wheels 13 and 15 to the countershaft 17 which by the gear wheels 18 and 19 rotates the driven shaft 11 at first speed. When it is desired to move into second speed the operator moves the lever 43 forwardly a short distance and then to the left into engagement with the right-hand end of the rod 52, and then the lever 43 is swung farther to the left to move the rod 52 and with it the fork 51, the shifting collar 50, the gear wheel 14 and its coupling member 31 to the left until the coupling member 31 is in engagement with the coupling member 33. When this takes place, the rotary motion of the shaft 10 is transmitted by the coupling members 33 and 31 and the gear wheels 14 and 16 to the countershaft 17 which is now rotated at a higher rate of speed and consequently drives the driven shaft 11 at a higher rate of speed. Likewise the gear wheels 15 and 13 are rotated at a higher rate of speed whereby the coupling member 30 is caused to automatically slide out of engagement with the slower rotating coupling member 32, as previously explained. When it is desired to drive the driven shaft 11 at the highest speed, that of the power shaft 10, then the operator shifts the lever 43 farther toward the front and engages the same with the shoulder 63 and then imparts a swinging movement to the left to the lever 43 to shift the rod 62 in the same direction and with it the fork 61, the shifting collar 60, the coupling member 34 to engage the latter with the coupling member 35. The driven shaft 11 is now driven direct from the power shaft 10 and consequently the countershaft 17 is driven at a higher rate of speed whereby the gear wheel 16 rotates the gear wheel 14 at a higher rate of speed than that of the power shaft 10 so that the coupling member 31 automatically moves out of engagement with the slower rotating coupling member 33. When it is desired to change back to lower speeds, the operator swings the lever 43 to the right and into engagement with the lug 64 to move the rod 62 to the right with a view to move the coupling member 34 out of engagement with the coupling member 35. The several parts are now again in neutral position and, if desired, the operator can now shift the lever 43 either for first speed or for second speed or for reversing, as the case may be, but it is understood that when the operator shifts the lever to first speed and then to second speed and finally to third speed then the lower speeds are automatically moved out of action, as previously explained.

Having thus described my invention, I claim as new and desire to secure by Letters Patent:—

1. A change speed gearing comprising different speed gears carried by a shaft, manual means for moving said gears successively into action from a lower to a higher speed, and means carried by each of said different speed gears for coupling the same to the shaft and for automatically moving the coupling member of a lower speed gear out of active position by the increased speed of such lower speed gear on shifting to the next higher speed.

2. A change speed gearing, comprising a power shaft, a countershaft, different speed gear wheels connecting the said power shaft and the said countershaft with each other, shifting means for shifting from lower speed gear wheels in active position to the next higher speed gear wheels, and automatic means automatically shifting the lower speed gear wheels out of active position into non-active position on shifting the next higher gear wheels into active position.

3. A change speed gearing, comprising a power shaft, a countershaft, a shaft to be driven, gear wheels connecting the said countershaft with the said shaft to be driven, different speed gear wheels connecting the said power shaft and the said countershaft with each other, shifting means for shifting from lower speed gear wheels in active position to the next higher speed gear wheels, and automatic means automatically shifting the lower speed gear wheels out of active position into non-active position on shifting the next higher gear wheels into active position.

4. A change speed gearing comprising a power shaft, a countershaft, a shaft to be driven and driven from the said countershaft, a set of gear wheels of different diameters fixed on the said countershaft, a set of shiftable gear wheels of different diameters loose on the said power shaft and in mesh with corresponding gear wheels on the countershaft, manually controlled shifting means for shifting the gear wheels on the power shaft to rotate with the latter, and automatic means for moving an active low speed gear wheel on the power shaft into inactive position on shifting the next higher speed gear wheel on the power shaft into active position to rotate with the power shaft.

5. A change speed gearing, comprising a power shaft, a countershaft, a shaft to be driven and driven from the said countershaft, a set of gear wheels of different diameters fixed on the said countershaft, a set of shiftable gear wheels of different diameters loose on the said power shaft and in mesh with corresponding gear wheels on the countershaft, coupling members on the said shiftable gear wheels, coupling members fixed on the power shaft and adapted to be engaged by the corresponding coupling members on the shiftable gear wheels, and manually controlled shifting means for shifting the gear wheels on the power shaft to engage the coupling members of the shiftable gear wheels with the corresponding fixed coupling members.

6. A change speed gearing, comprising a power shaft, a countershaft, a shaft to be driven and driven from the said countershaft, a set of gear wheels of different diameters fixed on the said countershaft, a set of shiftable gear wheels of different diameters loose on the said power shaft and in mesh with corresponding gear wheels on the countershaft, cam coupling members on the said shiftable gear wheels, cam coupling members fixed on the power shaft and adapted to be engaged by the corresponding coupling members on the shiftable gear wheels, independent shifting devices for the said shiftable gear wheels, and a single lever controlling the said shifting devices.

7. A change speed gearing, comprising a power shaft, a countershaft, a shaft to be driven and driven from the said countershaft, a set of gear wheels of different diameters fixed on the said countershaft, a set of shiftable gear wheels of different diameters loose on the said power shaft and in mesh with corresponding gear wheels on the countershaft, cam coupling members on the said shiftable gear wheels, cam coupling members fixed on the power shaft and adapted to be engaged by the corresponding coupling members on the shiftable gear wheels, independent shifting devices for the said shiftable gear wheels, a single lever controlling the said shifting devices, and a fixed guide for the said shifting lever.

8. A change speed gearing having different speeds, means for moving the different speeds successively into action from a lower speed to a higher speed, cam coupling members for the different speeds when in active position, and means for automatically moving the coupling member of a lower speed out of active position on shifting to the next higher speed.

9. A change speed gearing, comprising a power shaft, a countershaft, gear wheels of different diameters fixed on the countershaft, shiftable gear wheels of different diameters loose on the power shaft, and in mesh with corresponding gear wheels on the countershaft, cam coupling members on the shiftable gear wheels and adapted to engage corresponding cam coupling members fixed on the power shaft, and shifting means for the shiftable gear wheels for shifting from a lower speed in active position to the next higher speed, thereby causing the lower speed gear wheels to rotate at a higher rate of speed than the power shaft, whereby the cam coupling member of the lower speed shiftable gear wheel is automatically moved out of engagement with the corresponding coupling member on the power shaft.

GEORGE Q. SEAMAN.